United States Patent
Rotem et al.

(10) Patent No.: US 10,579,383 B1
(45) Date of Patent: Mar. 3, 2020

(54) SYSTEMS AND METHODS FOR EFFICIENT SCALING OF QUANTIZED INTEGERS

(71) Applicant: Facebook, Inc., Menlo Park, CA (US)

(72) Inventors: Nadav Rotem, Santa Clara, CA (US); Jong Soo Park, Mountain View, CA (US); Zhaoxia Deng, San Mateo, CA (US); Abdulkadir Utku Diril, Menlo Park, CA (US); Mikhail Smelyanskiy, Burlingame, CA (US); Roman Dzhabarov, Menlo Park, CA (US); James Wesley Hegeman, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/992,793

(22) Filed: May 30, 2018

(51) Int. Cl.
*G06F 7/483* (2006.01)
*G06F 9/355* (2018.01)
*G06F 7/49* (2006.01)

(52) U.S. Cl.
CPC ............ *G06F 9/3555* (2013.01); *G06F 7/483* (2013.01); *G06F 7/49* (2013.01)

(58) Field of Classification Search
CPC ... G06F 5/01; G06F 7/487; G06F 7/52; G06F 7/483
See application file for complete search history.

(56) References Cited

U.S. PATENT DOCUMENTS

| | | | |
|---|---|---|---|
| 2018/0107451 A1* | 4/2018 | Harrer | G06F 7/483 |
| 2018/0322607 A1* | 11/2018 | Mellempudi | G06F 7/5443 |
| 2019/0042935 A1* | 2/2019 | Deisher | G06F 7/57 |
| 2019/0122100 A1* | 4/2019 | Kang | G06F 7/49957 |

* cited by examiner

*Primary Examiner* — Chuong D Ngo
(74) *Attorney, Agent, or Firm* — FisherBroyles, LLP (57) ABSTRACT

The disclosed computer-implemented method may include receiving an input value and a floating-point scaling factor and determining (1) an integer scaling factor based on the floating-point scaling factor, (2) a pre-scaling adjustment value representative of a number of places by which to shift a binary representation of the input value prior to a scaling operation, and (3) a post-scaling adjustment value representative of a number of places by which to shift the binary representation of the input value following the scaling operation. The method may further include calculating a scaled result value by (1) shifting rightwards the binary representation of the input value by the pre-scaling adjustment value, (2) scaling the shifted binary representation of the input value by the integer scaling factor, and (3) shifting rightwards the shifted and scaled binary value by the post-scaling adjustment value. Various other methods, systems, and computer-readable media are also disclosed.

20 Claims, 6 Drawing Sheets

Listing 400

```
        QuantizationTransform32To8 quantizeScaleOffset32To8(float scale,
                                                             int32_t offset) {
402 ─── int preShift = 0;
404 ─── int postShift = 0;

// Determine post-scaling adjustment value 212 and
        // integer scaling factor 208.

406  {  while (scale < 0.5 || postShift < 15) {
          scale *= 2;
          postShift++;
        }

// Determine pre-scaling adjustment value 210 and
        // continue to determine integer scaling factor 208.

408  {  while (scale < 255 && preShift < (postShift / 2)) {
          scale *= 2;
          preShift++;
        }

// Return pre-scaling adjustment value 210,
        // post-scaling adjustment value 212,
        // integer scaling factor 208, and
        // a predetermined offset value.
410 ─── return {preShift, postShift, std::round(scale), offset};
        }
```

*FIG. 4*

502
FP Scaling Factor:    0.41
INT Scaling Factor:   13,435
Pre-Scaling Adjustment:   0
Post-Scaling Adjustment:  15

504
Input (Decimal):    125
Scaled Input (Decimal):  1,679,375
Scaled Input (Binary):   00000000 00011001 10100000 00001111

506
31 30 29 28 27 26 25 24 23 22 21 20 19 18 17 16 15 14 13 12 11 10 9 8 7 6 5 4 3 2 1 0
0 0 0 0 0 0 0 0 0 0 0 0 1 1 0 0 1 1 0 1 0 0 0 0 0 0 0 0 1 1 1 1

0 0 0 0 0 0 0 0 0 0 0 0 0 0 0 0 0 0 0 0 0 0 0 0 1 1 0 0 1 1

508
Result (Binary):    00000000 00000000 00000000 00110011
Result (Decimal):   51

510  Target Result (Decimal): 51.25

View 500

SYSTEMS AND METHODS FOR EFFICIENT SCALING OF QUANTIZED INTEGERS

BACKGROUND

Artificial intelligence (AI) can enable computers to perform various complicated tasks, such as those related to cognitive functions that are typically associated with humans. These functions often involve making predictions or assessments based on real-world inputs. Several approaches to AI are prevalent, including machine learning techniques. Machine learning systems, in at least some examples, may be trained using known data sets rather than employing a specific predetermined algorithm to perform a task.

One machine learning model, referred to as an artificial neural network (ANN), is inspired by the interconnections of neurons in a biological brain. Typically, ANNs include multiple computational nodes arranged in interconnected layers, with each node modeling a neuron that may receive one or more inputs, process the inputs, and pass an output to the next layer, with the final layer producing a desired output. In some examples, each node may assign a weight to each of its inputs and then combine (e.g., sum) the weighted inputs to produce a result from that node. For example, if a task involves identifying a particular object in an image, filter weights may be trained to correspond to a probability that the input image includes the object.

Some operations of ANNs may require a high amount of computing resources, which may limit computing hardware devices that may effectively utilize such ANNs (e.g., to make inferences regarding data using a particular ANN). In recent years, methods have been developed that may modify specific aspects of ANNs such that the ANNs may be utilized by computing hardware devices with fewer and/or more specific computing capabilities. For example, quantization processes may apply techniques to store numbers and/or perform calculations associated with an ANN in more compact and/or more efficient formats.

Unfortunately, conventional quantization methods may include computationally intensive and/or expensive computing operations, such as scaling of quantized integers (e.g., 32-bit quantized integers) to lower bit depth integers (e.g., 8-bit quantized integers) via conventional floating-point multiplication operations. These inefficient scaling operations may increase the cost and/or the complexity of quantization of ANNs. The instant disclosure, therefore, identifies and addresses a need for additional systems and methods for efficient scaling of quantized integers.

SUMMARY

As will be described in greater detail below, the instant disclosure describes various systems and methods for efficient scaling of quantized integers by (1) converting expensive (e.g., processing and/or memory resource intensive) floating-point operations (e.g., floating-point multiplication operations) associated with scaling operations into efficient bit-wise operations and/or integer arithmetic operations, and (2) scaling quantized integers in accordance with the converted operations. For example, an embodiment of the instant disclosure may calculate a scaled result value by (1) shifting rightwards a binary representation of an input value by a determined pre-scaling adjustment value, (2) scaling the shifted binary representation of the input value by an integer scaling factor determined based on a floating-point scaling factor, and (3) shifting rightwards the shifted and scaled binary value by a determined post-scaling adjustment value.

In one example, a computer-implemented method for efficient scaling of quantized integers may include receiving an input value and a floating-point scaling factor for a scaling operation. The method may further include determining (1) an integer scaling factor based on the floating-point scaling factor, (2) a pre-scaling adjustment value representative of a number of places by which to shift a binary representation of the input value prior to a scaling operation, and (3) a post-scaling adjustment value representative of a number of places by which to shift the binary representation of the input value following the scaling operation. The method may also include calculating a scaled result value by (1) shifting rightwards the binary representation of the input value by the pre-scaling adjustment value, (2) scaling the shifted binary representation of the input value by the integer scaling factor, and (3) shifting rightwards the shifted and scaled binary value by the post-scaling adjustment value.

In some examples, the input value may include a 32-bit signed binary integer value. In at least one example, the method may further include adjusting the scaled result value in accordance with a predetermined offset value. In at least one embodiment, the method may further include mapping the scaled result value to an 8-bit signed binary integer value.

In some embodiments, scaling the shifted binary representation of the input value may include executing an integer multiplication operation using the shifted binary representation of the input value and the integer scaling factor.

In some examples, determining the integer scaling factor, the pre-scaling adjustment value, and the post-scaling adjustment value may include, while at least one of the floating-point scaling factor is less than a predetermined floor value or the post-scaling adjustment value is less than a predetermined maximum shift value, (1) incrementing the post-scaling adjustment value by a predetermined increment, and (2) scaling the floating-point scaling factor by a predetermined scaling value. In at least one example, the predetermined maximum shift value may be at most half of a word size of the binary representation of the input value. In some examples, (1) the predetermined increment may include a positive integer value, (2) the predetermined scaling value may include a result of an exponentiation operation with a base of two and the positive integer value as an exponent, and (3) scaling the floating-point scaling factor by the predetermined scaling value may include multiplying the floating-point scaling factor by the predetermined scaling value.

In at least one embodiment, determining the integer scaling factor, the pre-scaling adjustment value, and the post-scaling adjustment value may further include, while the floating-point scaling factor may be less than a predetermined maximum floating-point scaling factor and the pre-scaling adjustment value is less than the post-scaling adjustment value scaled by an additional predetermined scaling value, (1) incrementing the pre-scaling adjustment value by the predetermined increment, and (2) scaling the floating-point scaling factor by the predetermined scaling value.

In at least one example, the predetermined maximum floating-point scaling factor may be a maximum value that may be representable within a target binary word size. In some examples, determining the integer scaling factor may further include (1) rounding the scaled floating-point scaling factor to a nearest integer value, and (2) designating the nearest integer value as the integer scaling factor.

In addition, a corresponding system for efficient scaling of quantized integers may include several modules stored in memory, including a receiving module that receives an input value and a floating-point scaling factor for a scaling operation. The system may further include a determining module that determines (1) an integer scaling factor based on the floating-point scaling factor, (2) a pre-scaling adjustment value representative of a number of places by which to shift a binary representation of the input value prior to a scaling operation, and (3) a post-scaling adjustment value representative of a number of places by which to shift the binary representation of the input value following the scaling operation. The system may further include a calculating module, stored in memory, that calculates a scaled result value by (1) shifting rightwards the binary representation of the input value by the pre-scaling adjustment value, (2) scaling the shifted binary representation of the input value by the integer scaling factor, and (3) shifting rightwards the shifted and scaled binary value by the post-scaling adjustment value. The system may further include at least one physical processor that executes the receiving module, the determining module, and the calculating module.

In some examples, the input value may include a 32-bit signed binary integer value. In at least one example, the calculating module may further adjust the scaled result value in accordance with a predetermined offset value. In at least one embodiment, the system may further include a mapping module that maps the scaled result value to an 8-bit signed binary integer value.

In some embodiments, the calculating module may scale the shifted binary representation of the input value by executing an integer multiplication operation using the shifted binary representation of the input value and the integer scaling factor.

In some examples, the determining module may determine the integer scaling factor, the pre-scaling adjustment value, and the post-scaling adjustment value by, while at least one of the floating-point scaling factor is less than a predetermined floor value or the post-scaling adjustment value is less than a predetermined maximum shift value, (1) incrementing the post-scaling adjustment value by a predetermined increment, and (2) scaling the floating-point scaling factor by a predetermined scaling value.

In at least one embodiment, the determining module may further determine the integer scaling factor, the pre-scaling adjustment value, and the post-scaling adjustment value further by, while the floating-point scaling factor is less than a predetermined maximum floating-point scaling factor and the pre-scaling adjustment value is less than the post-scaling adjustment value scaled by an additional predetermined scaling value, (1) incrementing the pre-scaling adjustment value by the predetermined increment, and (2) scaling the floating-point scaling factor by the predetermined scaling value.

In some examples, the determining module may further determine the integer scaling factor by (1) rounding the scaled floating-point scaling factor to a nearest integer value, and (2) designating the nearest integer value as the integer scaling factor.

In some examples, the above-described method may be encoded as computer-readable instructions on a computer-readable medium. For example, a computer-readable medium may include one or more computer-executable instructions that, when executed by at least one processor of a computing device, may cause the computing device to receive an input value and a floating-point scaling factor for a scaling operation.

The computer-readable medium may further include one or more computer-readable instructions that, when executed by the processor of the computing device, may cause the computing device to determine (1) an integer scaling factor based on the floating-point scaling factor, (2) a pre-scaling adjustment value representative of a number of places by which to shift a binary representation of the input value prior to a scaling operation, and (3) a post-scaling adjustment value representative of a number of places by which to shift the binary representation of the input value following the scaling operation.

The computer-readable medium may further include one or more computer-readable instructions that, when executed by the processor of the computing device, may cause the computing device to calculate a scaled result value by (1) shifting rightwards the binary representation of the input value by the pre-scaling adjustment value, (2) scaling the shifted binary representation of the input value by the integer scaling factor, and (3) shifting rightwards the shifted and scaled binary value by the post-scaling adjustment value.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for efficient scaling of quantized integers. As will be explained in greater detail below, embodiments of the instant disclosure may receive an input value and a floating-point scaling factor for a scaling operation. In some examples, the input value may include a 32-bit signed integer.

Additionally, an embodiment may determine an integer scaling factor based on the floating-point scaling factor, a pre-scaling adjustment value, and a post-scaling adjustment value. In some examples, the pre-scaling adjustment value may be representative of a number of places (e.g., positions representative of relative value within a binary representation of the input value number) to shift a binary representation of the binary input value prior to a scaling operation (e.g., one place, two places, three places, etc.), and the post-scaling value may be representative of a number of places by which to shift the binary representation of the input value following the scaling operation (e.g., one place, two places, three places, etc.).

An embodiment may also calculate a scaled result value by shifting rightwards the binary representation of the input value by the pre-scaling adjustment value (e.g., one place, two places, three places, etc.). The embodiment may also scale the shifted binary representation of the input value by the integer scaling factor, and may also shift rightwards the shifted and scaled binary representation of the input value by the post-scaling adjustment value (e.g., one place, two places, three places, etc.).

By eliminating expensive floating-point multiplication operations and replacing them with integer operations, the systems and methods described herein may efficiently and accurately scale a useful range of integers (e.g., 32-bit integers) to values that may be mapped to integers with a lower bit depth (e.g., 8-bit integers). Additionally, the systems and methods described herein may improve the efficiency of quantization of ANNs such that a quantization process may be efficiently implemented on computing hardware with fewer computing resources than may be required by traditional quantization processes. Therefore, the systems and methods described herein may improve the functioning of one or more computing devices. Furthermore, the systems and methods described herein may, through improving the ability of computing devices to make inferences regarding input data via quantized ANNs, improve diverse fields such as pattern recognition (e.g., image recognition, pattern recognition, etc.), data mining, medical diagnosis, and so forth.

The following will provide, with reference to FIGS. 1-2 and 4-6, detailed descriptions of systems for efficient scaling of quantized integers. Detailed descriptions of corresponding computer-implemented methods will also be provided in connection with FIG. 3.

Figure 1:
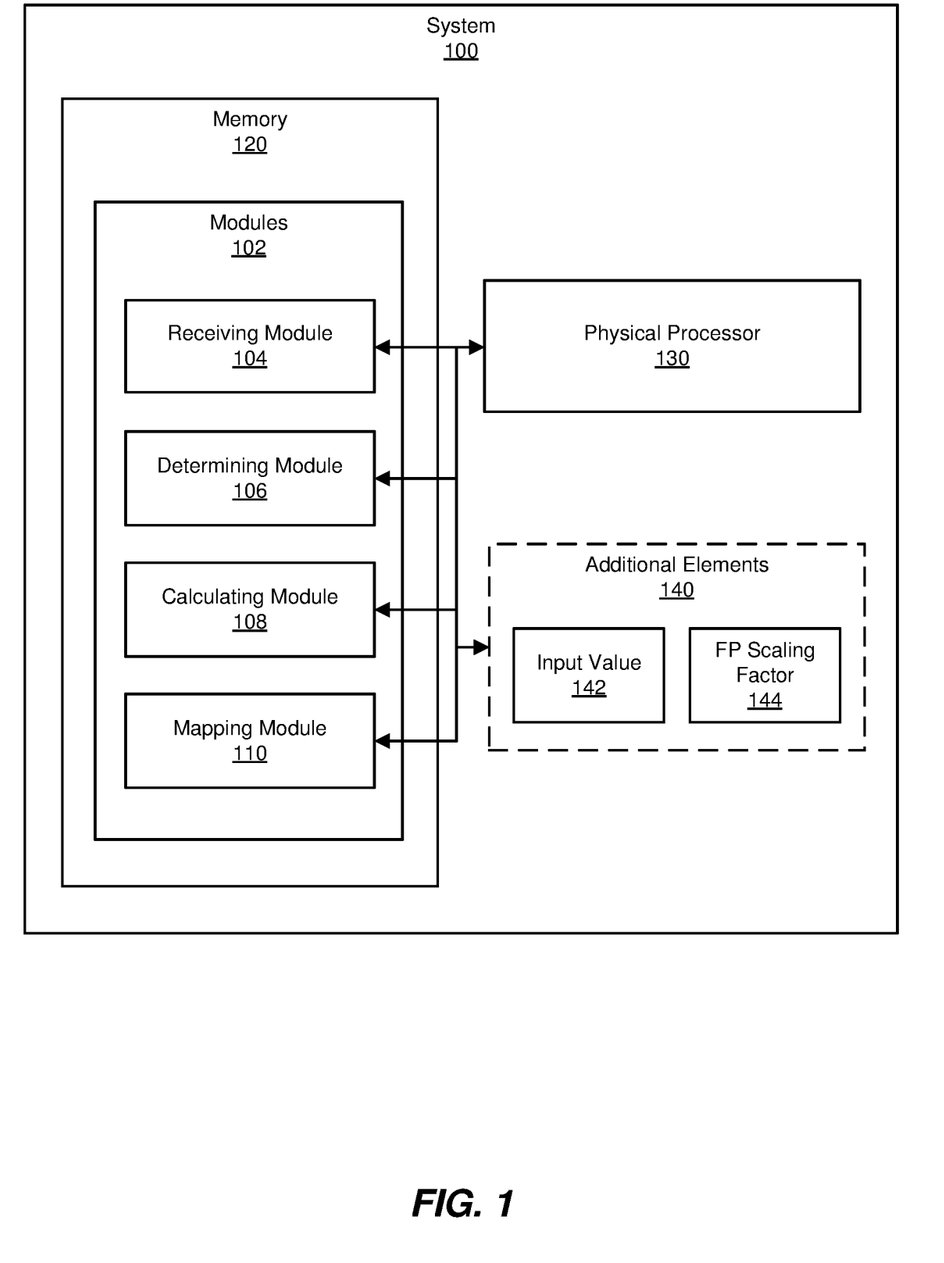
FIG. 1 is a block diagram of an example system for efficient scaling of quantized integers.

FIG. 1 is a block diagram of an example system 100 for efficient scaling of quantized integers. As illustrated in this figure, example system 100 may include one or more modules 102 for performing one or more tasks. As will be explained in greater detail below, modules 102 may include a receiving module 104 that may receive an input value and a floating-point scaling factor for a scaling operation. Example system 100 may further include a determining module 106 that may determine (1) an integer scaling factor based on the floating-point scaling factor, (2) a pre-scaling adjustment value representative of a number of places by which to shift a binary representation of the input value prior to a scaling operation, and (3) a post-scaling adjustment value representative of a number of places by which to shift the binary representation of the input value following the scaling operation.

As also shown in FIG. 1, example system 100 may further include a calculating module 108 that may calculate a scaled result value by (1) shifting rightwards the binary representation of the input value by the pre-scaling adjustment value, (2) scaling the shifted binary representation of the input value by the integer scaling factor, and (3) shifting rightwards the shifted and scaled binary representation of the input value by the post-scaling adjustment value. In some embodiments, as also shown in FIG. 1, example system 100 may also include a mapping module that may map the scaled result value to an 8-bit signed binary integer value.

Example system 100 may also include one or more memory devices, such as memory 120. Memory 120 generally represents any type or form of volatile or non-volatile storage device or medium capable of storing data and/or computer-readable instructions. In one example, memory 120 may store, load, and/or maintain one or more of modules 102. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As further illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 120. Additionally or alternatively, physical processor 130 may execute one or more of modules 102 to facilitate efficient scaling of quantized integers. Examples of physical processor 130 include, without limitation, microprocessors, microcontrollers, central processing units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

In some examples, as will be described in additional detail below, one or more of the elements of example system 100 (e.g., one or more of modules 102, such as receiving module 104) may interact with (e.g., receive) one or more additional elements 140 (e.g., input value 142 and/or floating-point scaling factor 144 ("FP Scaling Factor 144" in FIGS. 1 and 2) in order to efficiently scale quantized integers in accordance with the systems and methods described herein.

Figure 2:
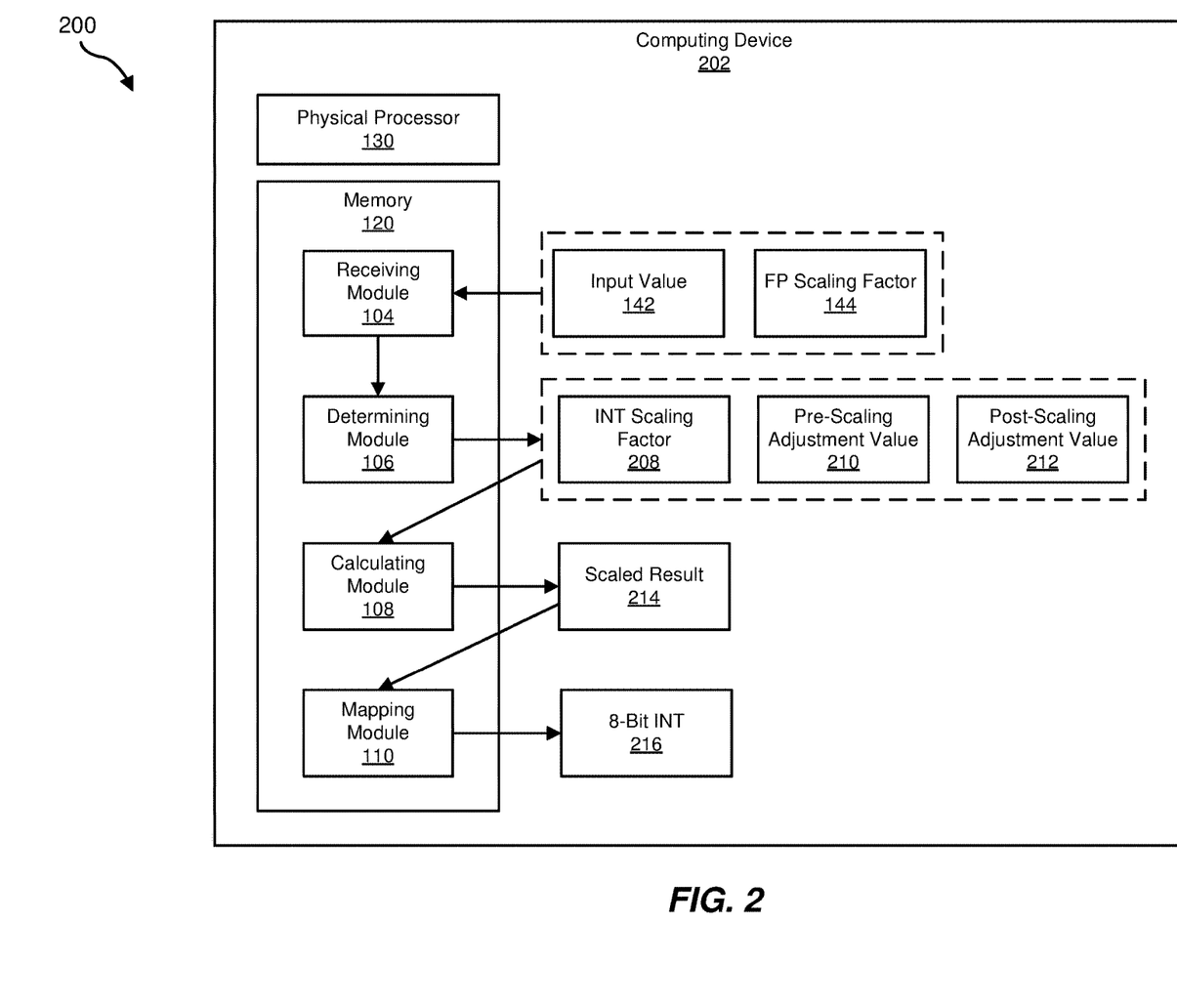
FIG. 2 is a block diagram of an example implementation of a system for efficient scaling of quantized integers.

Example system 100 in FIG. 1 may be implemented in a variety of ways. For example, all or a portion of example system 100 may represent portions of an example system 200 ("system 200") in FIG. 2. As shown in FIG. 2, example system 200 may include computing device 202. In at least one example, computing device 202 may be programmed with one or more of modules 102.

In at least one embodiment, one or more modules 102 from FIG. 1 may, when executed by computing device 202, enable computing device 202 to perform one or more operations to efficiently scale quantized integers. For example, as will be described in greater detail below, receiving module 104 may cause computing device 202 to receive an input value (e.g., input value 142) and a floating-point scaling factor (e.g., floating-point scaling factor 144, also "FP scaling factor 144" in FIG. 2) for a scaling operation. In some examples, the input value may include a 32-bit signed binary integer value and/or the floating-point scale factor may include a 32-bit signed binary floating-point value.

Furthermore, determining module 106 may cause computing device 202 to determine an integer scaling factor (e.g., integer scaling factor 208, also "INT Scaling Factor 208" in FIG. 2) based on the floating-point scaling factor. In some examples, determining module 106 may further cause computing device 202 to determine a pre-scaling adjustment value (e.g., pre-scaling adjustment value 210) representative of a number of places by which to shift a binary representation of the input value prior to a scaling operation. Additionally, determining module 106 may also determine a post-scaling adjustment value (e.g., post-scaling adjustment value 212) representative of a number of places by which to shift the binary representation of the input value following the scaling operation.

Additionally, calculating module 108 may calculate a scaled result value (e.g., scaled result 214) by (1) shifting rightwards the binary representation of the input value (e.g., input value 142) by the pre-scaling adjustment value, (2) scaling the shifted binary representation of the input value by the integer scaling factor, and (3) shifting rightwards the shifted and scaled binary representation of the input value by the post-scaling adjustment value. In some examples, calculating module 108 may scale the shifted binary representation of the input value (e.g., input value 142) by executing an integer multiplication operation using the shifted binary representation of the input value and the integer scaling factor (e.g., integer scaling factor 208). In at least one example, calculating module 108 may further calculate the scaled result value by adjusting the scaled result value in accordance with a predetermined offset value.

Furthermore, in some examples, mapping module 110 may map the scaled result value (e.g., scaled result 214) to an 8-bit signed binary integer value (e.g., 8-bit integer 216, also "8-Bit INT 216" in FIG. 2).

Computing device 202 generally represents any type or form of computing device capable of reading and/or executing computer-executable instructions and/or hosting executables. Examples of computing device 202 include, without limitation, application servers, storage servers, database servers, web servers, desktops, laptops, and/or any other suitable computing device configured to run certain software applications and/or provide various application, storage, and/or database services.

In at least one example, computing device 202 may be a computing device programmed with one or more of modules 102. All or a portion of the functionality of modules 102 may be performed by computing device 202 and/or any other suitable computing system. As will be described in greater detail below, one or more of modules 102 from FIG. 1 may, when executed by at least one processor of computing device 202, may enable computing device 202 efficiently scale quantized integers.

Many other devices or subsystems may be connected to example system 100 in FIG. 1 and/or example system 200 in FIG. 2. Conversely, all of the components and devices illustrated in FIGS. 1 and 2 need not be present to practice the embodiments described and/or illustrated herein. The devices and subsystems referenced above may also be interconnected in different ways from those shown in FIG. 2. Example systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

Figure 3:
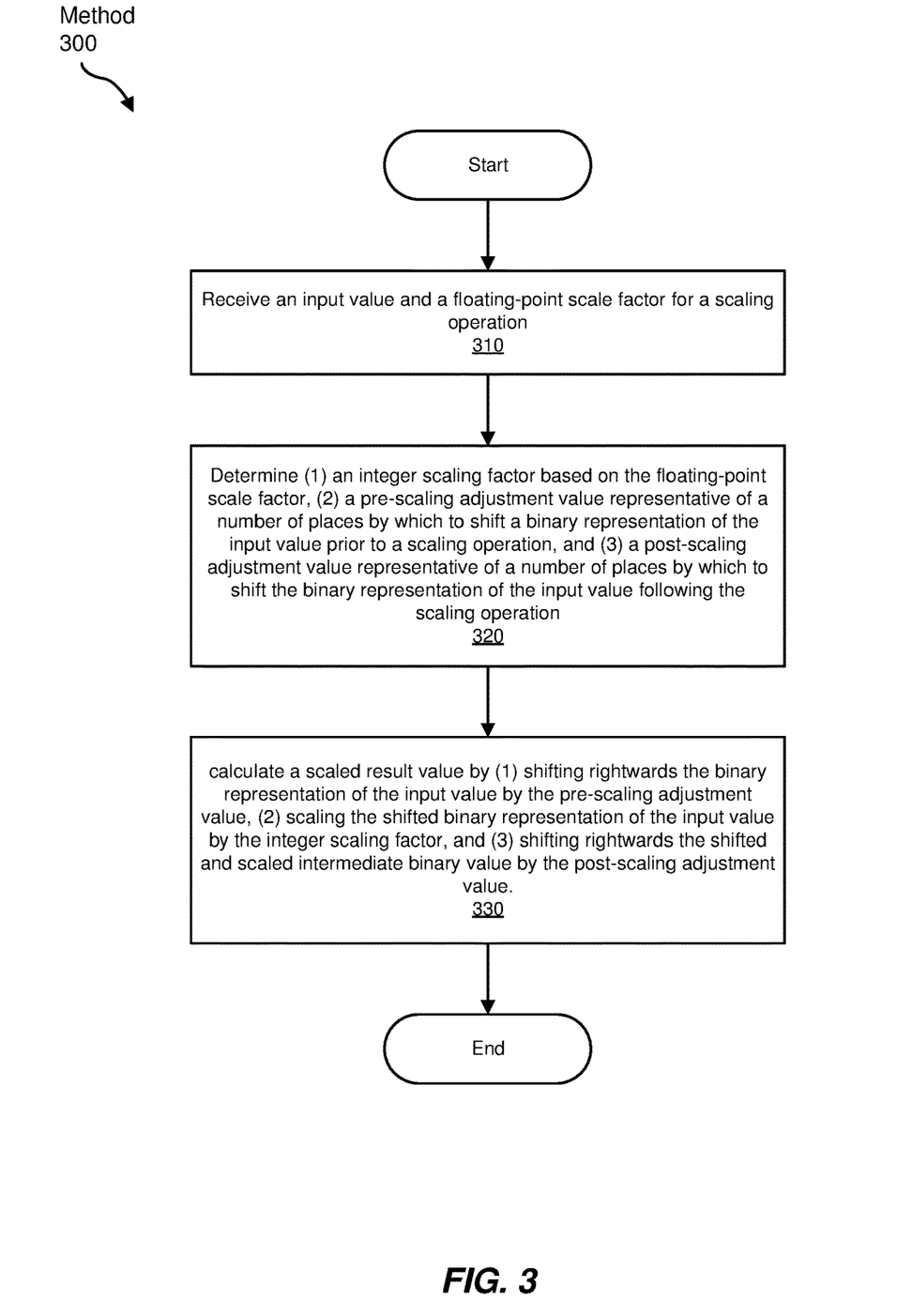
FIG. 3 is a flow diagram of an example method for efficient scaling of quantized integers.

FIG. 3 is a flow diagram of an example computer-implemented method 300 for efficient scaling of quantized integers. The steps shown in FIG. 3 may be performed by any suitable computer-executable code and/or computing system, including example system 100 in FIG. 1, example system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310, one or more of the systems described herein may receive an input value and a floating-point scale factor for a scaling operation. For example, receiving module 104 may, as part of computing device 202, cause computing device 202 to receive input value 142 and floating-point scaling factor 144 for a scaling operation.

In some examples, input value 142 may include any value that may be represented in a binary format and that may be scaled to another value that may be represented as a signed 8-bit signed binary integer value including, without limitation, a real number, an integer, a floating-point number, and so forth. As will be described in additional detail below, in at least one embodiment, input value 142 may include a 32-bit signed binary integer value (e.g., any integer value in a range from $-(2^{31})$ to $2^{31}-1$, or $-2,147,483,648$ to $2,147,483,647$) that may be scaled via floating-point scaling factor 144 to an integer value in a range from $-(2^7)$ to $2^7-1$ (e.g., $-128$ to $127$).

Additionally, in some embodiments, floating-point scaling factor 144 may include any value that may be represented in a binary format and that may be used to scale a value (e.g., input value 142) to a value that may be represented as an 8-bit integer. In at least one embodiment, floating-point scaling factor 144 may include a signed floating-point value represented in a 32-bit binary format, such as an IEEE 754 signed single-precision binary floating-point format.

As indicated above, input value 142 may be any integer value that may be scaled via floating-point scaling factor 144 to a value in a range that may be represented as a signed 8-bit integer. For example, if floating-point scaling factor 144 has a value of 2.5, input value 142 may include any integer in a range from $-51$ to $50$. As another example, if floating-point scaling factor 144 is 0.003, input value 142 may include any integer in a range from $-42,666$ to $42,333$.

Receiving module 104 may receive input value 142 and floating-point scaling factor 144 in a variety of contexts and/or from any suitable source. For example, receiving module 104 may receive input value 142 and/or floating-point scaling factor 144 from a data source that includes a representation of an ANN. The ANN may be configured to utilize input value 142 in one or more neural network operations, such as an operation that may enable the ANN to make one or more inferences regarding input data via one or more artificial neurons included in the ANN.

In some examples, input value 142 may represent a weight of one or more artificial neurons included in an ANN, a weight of one or more connections between two or more artificial neurons in an ANN, a value associated with a process (e.g., a calculation, a comparison, a determination, etc.) associated with one or more artificial neurons included in an ANN, and so forth. Receiving module 104 may therefore receive input value 142 from a data source that includes at least a portion of a representation of an ANN.

Additionally, in some examples, receiving module 104 may receive floating-point scaling factor 144 from any suitable source including, without limitation, a user, a computing device, a quantization process, a computing device that executes a quantization process, and so forth. In at least one example, receiving module 104 may receive floating-point scaling factor 144 by determining a floating-point value that may be used to scale a 32-bit signed integer input value (e.g., input value 142) to an 8-bit signed integer binary value. Receiving module 104 may then designate the determined floating-point value as floating-point scaling factor 144.

In some examples, receiving module 104 may determine whether a potential input value and/or a potential floating-point scaling factor is a legal input. For example, if a potential input value is outside of a range of values that may be scaled to a value in a range that may be represented as a signed 8-bit integer via a potential floating-point scaling factor, receiving module 104 may reject the potential input value and/or the potential floating-point scaling factor as an illegal input. Continuing with the previous example, if receiving module 104 receives a potential input value of 100,000 and a potential floating-point scaling factor of 0.003, receiving module 104 may determine that the potential input value may be scaled via the potential floating-point scaling factor to a scaled value of 300, which may be outside of a range that may be represented as a signed 8-bit integer (e.g., −128 to 127). In response, receiving module 104 may reject the potential input value and/or the potential floating-point scaling factor as illegal input.

Additionally, receiving module 104 may compare a potential input value to a known range of valid input values associated with a floating-point scaling factor (e.g., a known range of input values that, when scaled in accordance with the floating-point scaling factor, may result in scaled values in a range representable by a signed 8-bit binary integer). Based on the comparison, receiving module 104 may determine that a potential input value may be outside the known range of valid input values associated with the floating-point scaling factor.

For example, receiving module 104 may receive and/or designate a floating-point value of 2.5 as floating-point scaling factor 144. As mentioned above, a floating-point scaling factor of 2.5 may have an associated known range of valid input values of −51 to 50. When receiving module 104 then receives a potential input value of 60, receiving module 104 may compare the potential input value of 60 to the known range of valid input values associated with floating-point scaling factor 144. Receiving module 104 may then determine, based on the comparison, that the potential input value of 60 is outside of the known range of valid input values associated with floating-point scaling factor 144. Based on this determination, receiving module 104 may reject the potential input value of 60 as illegal input.

Continuing with this example, if receiving module 104 receives a potential input value of 40, receiving module 104 may compare the potential input value of 40 to the known range of valid input values associated with floating-point scaling factor 144 (e.g., −51 to 50). Receiving module 104 may then determine, based on the comparison, that the potential input value of 40 is within the known range of valid input values associated with floating-point scaling factor 144. Based on this determination, receiving module 104 may receive and/or designate the potential input value of 40 as input value 142.

Returning to FIG. 3, at step 320, one or more of the systems described herein may determine: (1) an integer scaling factor based on a floating-point scaling factor, (2) a pre-scaling adjustment value representative of a number of places by which to shift a binary representation of the input value prior to a scaling operation, and (3) a post-scaling adjustment value representative of a number of places by which to shift the binary representation of the input value following the scaling operation.

For example, determining module 106 may, as part of computing device 202, cause computing device 202 to determine an integer scaling factor (e.g., integer scaling factor 208) based on a floating-point scaling factor (e.g., floating-point scaling factor 144). Additionally, determining module 106 may also, as part of computing device 202, cause computing device 202 to determine a pre-scaling adjustment value (e.g., pre-scaling adjustment value 210) representative of a number of places by which to shift a binary representation of the input value (e.g., input value 142) prior to a scaling operation. Furthermore, determining module 106 may, as part of computing device 202, cause computing device 202 to determine a post-scaling adjustment value (e.g., post-scaling adjustment value 212) representative of a number of places by which to shift the binary representation of the input value following the scaling operation.

Determining module 106 may perform any of these operations in a variety of contexts. For example, in one embodiment, determining module 106 may determine the integer scaling factor, the pre-scaling adjustment value, and the post-scaling adjustment value by, while at least one of floating-point scaling factor 144 is less than a predetermined floor value (e.g., 1.0, 0.5, 0.1, etc.) or post-scaling adjustment value 212 is less than a predetermined maximum shift value, (1) incrementing the post-scaling adjustment value by a predetermined increment, and (2) scaling the floating-point scaling factor by a predetermined scaling value. In some examples, the predetermined maximum shift value may be at most half of a word size of the binary representation of the input value (e.g., 16 bits for a 32-bit integer value).

In some examples, the predetermined increment may include a positive integer value (e.g., 1, 2, 3, etc.). Additionally, in at least one embodiment, the predetermined scaling value may include a result of an exponentiation operation with a base of two and the positive integer value as an exponent. For example, the predetermined increment may include a positive integer value of 1. An exponentiation function with a base of 2 and an exponent of 1 may provide a result of 2 (e.g., $2^1$). Hence, in this example, the predetermined scaling value may include a value of 2.

In an additional example, the predetermined increment may include a positive integer value of 2. An exponentiation function with a base of 2 and an exponent of 2 may provide a result of 4 (e.g., $2^2$). Hence, in this additional example, the predetermined scaling value may include a value of 4. These examples may illustrate that, in some examples, the predetermined scaling value may include a power of 2 (e.g., 2, 4, 8, 16, etc.).

Furthermore, in some embodiments, determining module 106 may scale floating-point scaling factor 144 by the predetermined scaling value by multiplying floating-point scaling factor 144 by the predetermined scaling value. As described above, the predetermined scaling value may include a value that may be a power of 2 (e.g., 2, 4, 8, 16, etc.). Hence, multiplying floating-point scaling factor 144 by the predetermined scaling factor may be efficiently executed by adjusting (e.g., incrementing and/or decrementing) an exponent of a binary representation of floating-point scaling factor 144.

By way of illustration, in one example, floating-point scaling factor 144 may be a 32-bit floating-point value of 0.41. This value may be expressed in a suitable binary notation format (e.g., an IEEE 754 format, such as IEEE 754-2008 or binary32 format) as 0 01111101 10100011110101110000101, where the left-most 0 represents a sign bit that indicates a positive value, 01111101 represents an exponent of −2, and 10100011110101110000101 represents a mantissa or significand of 1.64. Hence, in this notation, floating-point scaling factor 144 may be equivalent to $1.64 \times 2^{-2} = 0.41$.

Continuing with the illustration, the predetermined increment may be 1, and the predetermined scaling value may be $2^1 = 2$. Multiplying floating-point scaling factor 144 by the predetermined scaling value of 2 may be accomplished by incrementing the exponent portion of the binary representation of floating-point scaling factor 144 by the predetermined increment of 1, which may result in a binary value of 0 01111110 10100011110101110000101, where the left-most 0 represents a sign bit that indicates a positive value, 01111110 represents an exponent of −1, and 10100011110101110000101 represents a mantissa or significand of 1.64. Hence, in this illustration, the scaled value of floating-point scaling factor 144 may be equivalent to $1.64 \times 2^{-1} = 0.82$.

Figure 4:
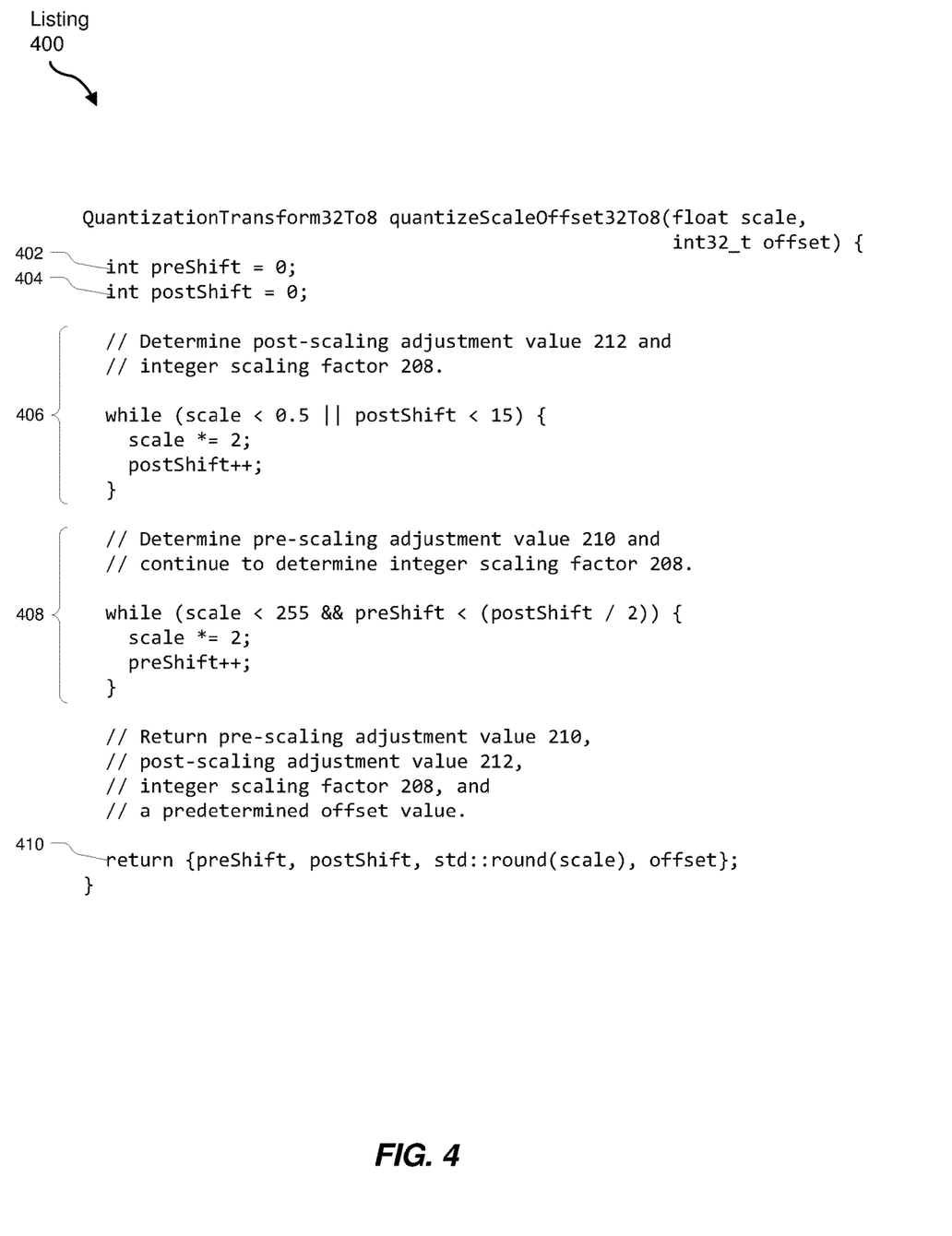
FIG. 4 is a listing that may illustrate computer code that may, when executed by at least one or more processors of a computing device, cause the device to determine (1) an integer scaling factor, (2) a pre-scaling adjustment value, and (3) a post-scaling adjustment value.

FIG. 4 includes a listing 400 that shows a segment of computer code that may, when executed by at least one or more processors of a computing device (e.g., physical processor 130, as included as part of example system 100, example system 200, and so forth), cause the device (e.g., one or more of modules 102 included in example system 100 and/or example system 200, such as determining module 106) to determine (1) integer scaling factor 208, (2) pre-scaling adjustment value 210, and (3) post-scaling adjustment value 212. Listing 400 may be expressed in a syntax similar to that of the C++ programming language. Although expressed in a syntax similar to that of the C++ programming language in listing 400, the computer code in listing 400 merely illustrates principles that may be alternatively expressed, programmed, encoded, and/or implemented in any suitable programming language.

As shown, listing 400 includes a function "quantizeScaleOffset32To8" that may be configured to accept a single-precision floating-point variable named "scale" and a 32-bit integer variable named "offset." Function quantizeScaleOffset32To8 may also be configured to return a data structure of a type "QuantizationTransform32To8." In some examples, variable scale may correspond to floating-point scaling factor 144. As will be described in greater detail below, variable offset may include a predetermined offset value that one or more of the systems described herein may utilize in order to efficiently scale quantized integers.

Listing 400 also includes declaration 402 and declaration 404. Declaration 402 may cause one or more of modules 102 (e.g., determining module 106) to declare an integer variable named "preShift" and assign it a value of 0. Likewise, declaration 404 may cause one or more of modules 102 (e.g., determining module 106) to declare an integer variable named "postShift" and assign it a value of 0.

As further shown in FIG. 4, listing 400 also includes loop 406 and loop 408. Each of loop 406 and loop 408 may represent a pre-test loop (e.g., "while" loops) that may cause one or more of modules 102 (e.g., determining module 106) to test a condition and/or expression prior to executing a code block associated with the loop. If the condition and/or expression evaluates to a value representative of "true" (e.g., a positive numeric value, a Boolean value representative of "true," etc.) then one or more of modules 102 (e.g., determining module 106) may execute the code block associated with the pre-test loop, and then re-evaluate the condition and/or expression. This process may continue until the condition and/or expression evaluates to a value representative of "false" (e.g., a non-positive value, a null value, a Boolean value representative of "false," etc.). Execution may then continue at a point following the code block associated with the loop.

In loop 406, one or more of modules 102 (e.g., determining module 106) may determine whether variable scale has a value less than a predetermined floor value of 0.5 or variable postShift has a value of less than a predetermined maximum shift value of 15. If so, one or more of modules 102 (e.g., determining module 106) may execute the code block associated with loop 406. The code block associated with loop 406 may cause one or more of modules 102 (e.g., determining module 106) to (1) multiply variable scale by the predetermined scaling value of 2 and may assign the result to variable scale (e.g., via the statement "scale*=2;"), and (2) increment variable postShift by the predetermined increment of 1 (e.g., via the statement "postShift++").

As will be described in greater detail below, once the condition and/or expression of loop 406 is satisfied (e.g., via the code included in the code block associated with loop 406), one or more of modules 102 (e.g., determining module 106) may proceed to execute loop 408.

In some embodiments, determining module 106 may further determine integer scaling factor 208, pre-scaling adjustment value 210, and post-scaling adjustment value 212 by, while floating-point scaling factor 144 is less than a predetermined maximum floating-point scaling factor and pre-scaling adjustment value 210 is less than post-scaling adjustment value 212 scaled by an additional predetermined scaling value, (1) incrementing pre-scaling adjustment value 210 by the predetermined increment, and (2) scaling the floating-point scaling factor by the predetermined scaling value. In at least one embodiment, the predetermined maximum floating-point scaling factor may be a maximum value that may be representable within a target binary word size. For example, in embodiments where the target binary word size is 8 bits, the predetermined maximum floating-point scaling factor may be 255.

To illustrate, returning to FIG. 4, In loop 406, one or more of modules 102 (e.g., determining module 106) may determine (1) whether variable scale is less than a predetermined maximum floating-point scaling factor of 255 (e.g., a maximum value that may be represented by an unsigned 8-bit integer), and (2) whether variable preShift is less than a value of variable postShift divided by an additional predetermined scaling value of 2 (e.g., scaled by a factor of 0.5). If these conditions are met, one or more of modules 102 (e.g., determining module 106) may execute the body of loop 408 by (1) multiplying variable scale by the predetermined scaling value of 2 and assigning the result to variable scale (e.g., via the statement "scale*=2;"), and (2) incrementing variable preShift by the predetermined increment of 1 (e.g., via the statement "preShift++").

In at least one embodiment, determining module 106 may determine integer scaling factor 208 by (1) rounding scaled floating-point scaling factor 144 to a nearest integer value, and (2) designating the nearest integer value as integer scaling factor 208. By way of illustration, return statement 410 in FIG. 4 includes a statement "std::round(scale)" which may cause one or more of modules 102 (e.g., determining module 106) to round a value corresponding to variable scale to a nearest integer value, and may further cause the computing device to designate the nearest integer value as integer scaling factor 208.

Hence, as further indicated by return statement 410, function quantizeScaleOffset32To8 may be configured to, when executed by a suitable computing device (e.g., one or more of modules 102 included in example system 100 and/or example system 200, such as determining module 106) return a QuantizationTransform32To8 data structure that includes variables preShift, postShift, a version of variable scale that has been rounded to a nearest integer value, and variable offset. In some examples, the returned value of variable preShift may represent determined pre-scaling adjustment value 210, the returned value of variable postShift may represent determined post-scaling adjustment value 212, the returned value of the statement std::round (scale) may represent determined integer scaling factor 208, and the returned value of variable offset may represent the predetermined offset value.

Returning to FIG. 3, at step 330, one or more of the systems described herein may calculate a scaled result value by (1) shifting rightwards a binary representation of an input value by a pre-scaling adjustment value, (2) scaling the shifted binary representation of the input value by an integer scaling factor, and (3) shifting rightwards the shifted and scaled binary value by a post-scaling adjustment value.

For example, calculating module 108 may, as part of computing device 202, cause computing device 202 to calculate a scaled result value (e.g., scaled result 214) by shifting rightwards a binary representation of an input value (e.g., input value 142) by a pre-scaling adjustment value (e.g., pre-scaling adjustment value 210). Calculating module 108 may additionally, as part of computing device 202, cause computing device 202 to further calculate the scaled result value by scaling the shifted binary representation of the input value by an integer scaling factor (e.g., integer scaling factor 208). Additionally, calculating module 108 may, as part of computing device 202, cause computing device 202 to further calculate the scaled result value by shifting rightwards the shifted and scaled binary representation of the input value by a post-scaling adjustment value.

In at least one embodiment, calculating module 108 may calculate the scaled result value in accordance with the C++ statement:

result=(((input_value>>preShift)*integer_scale)
>>postShift)+offset;

In this statement, input_value may represent input value 142, preShift may represent pre-scaling adjustment value 210, postShift may represent post-scaling adjustment value 212, integer_scale may represent integer scaling factor 208, and offset may represent a predetermined offset value.

In some examples, "shifting" a binary value or a binary representation of a value may include any bit-wise operation that may operate on one or more bit patterns included in a binary representation of a number. For example, shifting rightwards a binary representation of input value 142 may include executing an arithmetic right shift with the binary representation of input value 142 as an operand, wherein all binary digits (e.g., bits) included in the binary representation of input value 142 may be moved a given number of places (e.g., bit positions) rightward, and any places made vacant by the movement may be filled in with copies of a most significant bit of input value 142. Additionally, shifting rightwards a binary representation of input value 142 may include executing a logical right shift with the binary representation of input value 142 as an operand, wherein all binary digits included in the binary representation of input value 142 may be shifted (e.g., moved) a given number of places (e.g., bit positions) rightward, and any places made vacant by the movement may be filled in with zeroes.

In some programming languages (e.g., C, C++, C#, PYTHON, etc.), a rightwards binary shift operation may be represented by an expression n>>m, wherein n may represent a binary value and m may represent a number of places rightwards the operation may shift the binary value. Examples and illustrations of such bit-wise operations will be provided below in reference to FIGS. 5 and 6.

Figure 5:
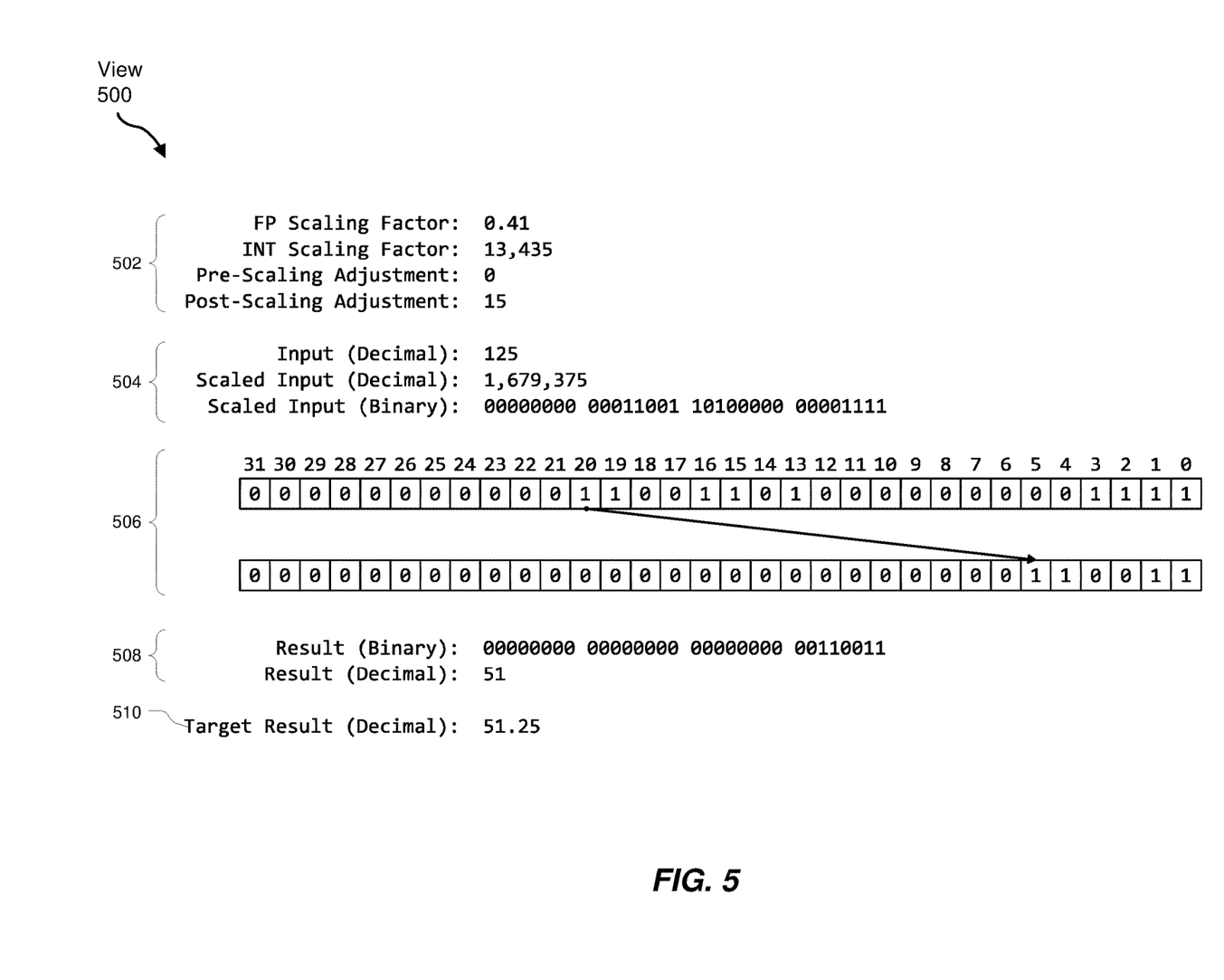
FIGS. 5 and 6 are views of examples that illustrate calculating a scaled result value by (1) shifting rightwards a binary representation of an input value by a pre-scaling adjustment value, (2) scaling the shifted binary representation of the input value by an integer scaling factor, and (3) shifting rightwards the shifted and scaled binary representation of the input value by the post-scaling adjustment value.

By way of illustration, FIG. 5 shows a view 500 that may illustrate an example of calculating a scaled result value in accordance with the systems and methods described herein. As shown, view 500 includes determined values 502, which includes a floating-point scaling factor ("FP Scaling Factor" in FIGS. 5 and 6) of 0.41, a determined integer scaling factor ("INT Scaling Factor" in FIGS. 5 and 6) of 13,435, a pre-scaling adjustment value of 0, and a post-scaling adjustment value of 15. In this example, because the pre-shift value is 0, calculating module 108 may not need to shift rightwards the binary representation of an input value by a pre-scaling adjustment value, and/or may shift rightwards the binary representation of the input value by the pre-scaling adjustment value of 0 (e.g., calculating module 108 may shift a binary representation of the input value rightwards by 0 places).

View 500 also includes input block 504, which may include various elements associated with an input value (e.g., input value 142). For example, input block 504 includes an input value of 125 expressed in decimal notation. Calculating module 108 may scale the input value of 125 by the determined integer scaling factor (e.g., 13,435) by executing an integer multiplication operation using the shifted binary representation of the input value and the integer scaling factor. This may result in a scaled input value of 1,679,375, as expressed in decimal notation. As further shown in input block 504, a binary representation of the scaled input value may be 00000000 00011001 10100000 00001111, separated into 8-bit segments herein and in FIGS. 5 and 6 for clarity.

As further shown in FIG. 5, view 500 also includes a shift block 506, which may illustrate calculating module 108 shifting rightwards the shifted and scaled binary value (e.g., the binary representation of the integer scaling factor of 1,679,375) by the post-scaling adjustment value (e.g., 15). As shown, calculating module 108 may execute a logical rightwards shift of 15 places, an arithmetic rightwards shift of 15 places, and/or any other suitable bit-wise operation to shift the shifted and scaled binary value rightwards by 15 places.

Following the post-scaling rightwards shift, as shown by result 508 included in view 500, a result value may be a binary value of 00000000 00000000 00000000 00110011, which may be expressed in decimal notation as 51. This value may correspond to scaled result 214.

As further shown in FIG. 5, target result 510 indicates that, if the input value of 125 were scaled via traditional floating-point multiplication rather than the systems and methods described herein, a result of the traditional floating-point multiplication operation may be 51.25, which may be approximately equal to (e.g., within a predetermined accuracy threshold) of result 508. Hence, the systems and methods described herein may scale integers (e.g., 32-bit quantized integers) with a high degree of accuracy while utilizing only efficient bit-wise operations and/or integer arithmetic operations.

Figure 6:
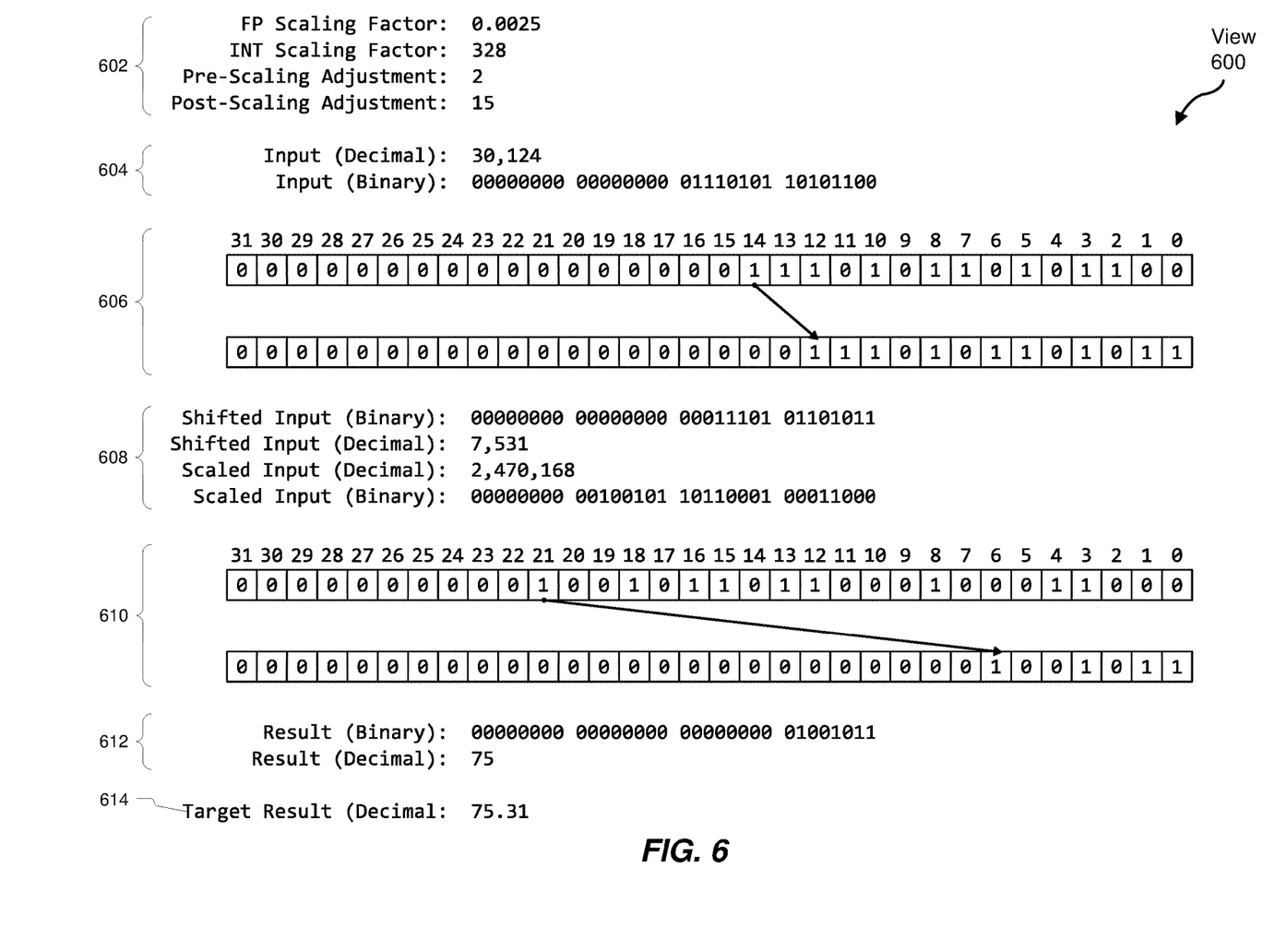

As an additional illustration, FIG. 6 shows a view 600 that illustrates an additional example of calculating a scaled result value in accordance with the systems and methods described herein. As shown, view 600 includes determined values 602, which includes a floating-point scaling factor of 0.0025, a determined integer scaling factor of 328, a pre-scaling adjustment value of 2, and a post-scaling adjustment value of 15. Input block 604 includes a decimal representation of an input value of 30,124, as well as a corresponding binary representation of the input value of 00000000 00000000 01110101 10101100.

In this example, unlike the example illustrated in FIG. 5, the pre-scaling adjustment value is 2. Hence, as illustrated in shift block 606, calculating module 108 may shift rightwards a binary representation of the input value by two places. As shown in block 608, the shifting of the binary representation of the input value by two places may result in a binary shifted input value of 00000000 00000000 00011101 01101011, with a decimal value of 7,531.

As further shown in block 608, calculating module may scale the shifted binary representation of the input value by the determined integer scaling factor (e.g., 13,435) by executing an integer multiplication operation using the shifted binary representation of the input value and the integer scaling factor. This may result in a scaled input value of 2,470,168 in decimal notation or 00000000 00100101 10110001 00011000 in binary notation.

As further shown in FIG. 6, view 600 also includes a shift block 610, which may illustrate calculating module 108 shifting rightwards the shifted and scaled binary value by the post-scaling adjustment value (e.g., 15). As shown, calculating module 108 may execute a logical rightwards shift of 15 places, an arithmetic rightwards shift of 15 places, and/or any other suitable bit-wise operation to shift the shifted and scaled binary value rightwards by 15 places.

Following the post-scaling rightwards shift, as shown by result 612 included in view 600, a result value may be 00000000 00000000 00000000 01001011 in binary notation, which may be expressed in decimal notation as 75. Additionally, target result 614 indicates that, if the input value of 30,124 were scaled using traditional floating-point multiplication rather than the systems and methods described herein, a result of such a floating-point multiplication operation may be 75.31, which may be approximately equal to (e.g., within a predetermined accuracy threshold) of result 612.

As mentioned above, calculating module 108 may further adjust scaled result 214 in accordance with a predetermined offset value. The predetermined offset value may be any suitable value that may be utilized in a quantization and/or scaling process to adjust scaled result 214 to a target range. In some examples, the predetermined offset value may be any value that represents an integer value.

Calculating module 108 may adjust scaled result 214 in accordance with the predetermined offset value in any suitable way. For example, calculating module 108 may adjust scaled result 214 by adding the predetermined offset value to scaled result 214, by multiplying scaled result 214 by the predetermined offset value, and so forth.

Hence, as mentioned above, the systems and methods described herein may scale certain ranges of integer values (e.g., integers that, when scaled, may be represented in by 8-bit signed binary integer values) with a high degree of accuracy while utilizing only efficient bit-wise operations, multiplication of floating-point exponents by powers of 2, and/or integer arithmetic operations.

Additionally, in some embodiments, one or more of the systems described herein may map a scaled result value to an 8-bit signed binary integer value. For example, mapping module 110 may, as part of computing device 202, cause computing device 202 to map scaled result 214 to 8-bit integer 216.

Mapping module 110 may map scaled result 214 to 8-bit integer 216 in a variety of contexts. For example, as described above, in some embodiments, scaled result 214 may be represented as a 32-bit signed integer value (e.g., a binary representation of the scaled result value as shown in result 508 and result 612). Therefore, in at least one embodiment, mapping module 110 may map scaled result 214 to 8-bit integer 216 by simply designating a lower-order 8-bit portion of scaled result 214 as 8-bit integer 216. In some embodiments, mapping module 110 may map scaled result 214 to 8-bit integer 216 by truncating a set of 24 higher-order bit values from scaled result 214, and/or by copying an ordered set of 8 lower-order bit values from scaled result 214 into an 8-bit memory block (e.g., an 8-bit location in a main memory and/or storage location such as memory 120, an 8-bit register associated with physical processor 130, etc.).

By mapping scaled result 214 to 8-bit integer 216, one or more of the systems and methods described herein (e.g., mapping module 110) may, among other benefits, free up at least a portion of a memory location and/or storage location that previously held scaled result 214. This may reduce an amount of memory and/or storage media consumed by the value included in scaled result 214.

As discussed throughout the instant disclosure, the disclosed systems and methods may provide one or more advantages over traditional options for scaling of quantized integers. For example, embodiments of the systems and methods described herein may eliminate expensive floating-point multiplication from a scaling process by representing the same process as a sequence of efficient integer arithmetic and/or bit-wise operations. Embodiments of the systems and methods described herein may determine limits for such operations that may provide accurate, efficient results over a predefined range of input values without overflowing one or more registers that store an input value. Hence, embodiments of the systems and methods described herein may provide accurate conversion for a specific, useful range of signed 32-bit integers into signed 8-bit integers, as well as efficient usage of limited computing resources.

For example, an embodiment of the systems and methods described herein may determine, from an input value and a floating-point scaling factor, an integer scaling factor, a pre-scaling adjustment value, and a post-scaling adjustment value. The integer scaling factor may correspond to a scaled version of the floating-point scaling factor, rounded to a nearest integer. Likewise, the pre-scaling and post-scaling adjustment values may correspond to a number of places by which to shift a binary representation of the input value before and after a scaling operation. An embodiment may determine the integer scaling factor, the pre-scaling adjustment value, and the post-scaling adjustment value such that additional operations described herein may not overflow a register that stores the input value.

An embodiment may also calculate a scaled result value by shifting rightwards a binary representation of the input value by the determined pre-scaling adjustment value, multiplying the shifted binary representation of the input value by the integer scaling factor, and shifting rightwards the shifted and scaled binary representation of the input value by the post-scaling adjustment value. An embodiment may also map the result to an 8-bit signed binary integer value.

By so converting expensive floating-point multiplication operations into efficient integer and/or bit-wise operations, the systems and methods described herein may efficiently scale higher-order (e.g., 32 bit) signed integers into lower-order (e.g., 8 bit) signed integers. This may be particularly useful in the context of quantization of ANNs and/or scaling of quantized integers included in ANNs, as such operations may require scaling of a large number of higher-order (e.g., 32 bit) integers into lower-order (e.g., 8 bit) integers.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive a floating-point scaling factor to be transformed, transform the floating-point scaling factor to an integer scaling factor, output a result of the transformation to scale an input value, use the result of the transformation to scale an input value for a quantization operation, and store the result of the transformation to scale additional input values. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   receiving, at an artificial neural network (ANN), an input value and a floating-point scaling factor for a scaling operation that is configured to scale one or more quantized integers to lower bit depths;
   determining, at the ANN:
      an integer scaling factor based on the floating-point scaling factor;
      a pre-scaling adjustment value representative of a number of places by which to shift a binary representation of the input value prior to a scaling operation; and
      a post-scaling adjustment value representative of a number of places by which to shift the binary representation of the input value following the scaling operation; and
   calculating, at the ANN, a scaled result value by:
      shifting rightwards the binary representation of the input value by the pre-scaling adjustment value;
      scaling the shifted binary representation of the input value by the integer scaling factor; and
      shifting rightwards the shifted and scaled binary representation of the input value by the post-scaling adjustment value.

2. The computer-implemented method of claim 1, wherein the input value comprises a 32-bit signed binary integer value.

3. The computer-implemented method of claim 1, further comprising adjusting the scaled result value in accordance with a predetermined offset value.

4. The computer-implemented method of claim 1, further comprising mapping the scaled result value to an 8-bit signed binary integer value.

5. The computer-implemented method of claim 1, wherein scaling the shifted binary representation of the input value comprises executing an integer multiplication operation using the shifted binary representation of the input value and the integer scaling factor.

6. The computer-implemented method of claim 1, wherein determining the integer scaling factor, the pre-scaling adjustment value, and the post-scaling adjustment value comprises:
while at least one of:
the floating-point scaling factor is less than a predetermined floor value, or
the post-scaling adjustment value is less than a predetermined maximum shift value,
incrementing the post-scaling adjustment value by a predetermined increment; and
scaling the floating-point scaling factor by a predetermined scaling value.

7. The computer-implemented method of claim 6, wherein the predetermined maximum shift value is at most half of a word size of the binary representation of the input value.

8. The computer-implemented method of claim 6, wherein:
the predetermined increment comprises a positive integer value;
the predetermined scaling value comprises a result of an exponentiation operation with a base of two and the positive integer value as an exponent; and
scaling the floating-point scaling factor by the predetermined scaling value comprises multiplying the floating-point scaling factor by the predetermined scaling value.

9. The computer-implemented method of claim 6, wherein determining the integer scaling factor, the pre-scaling adjustment value, and the post-scaling adjustment value further comprises, while the floating-point scaling factor is less than a predetermined maximum floating-point scaling factor and the pre-scaling adjustment value is less than the post-scaling adjustment value scaled by an additional predetermined scaling value:
incrementing the pre-scaling adjustment value by the predetermined increment; and
scaling the floating-point scaling factor by the predetermined scaling value.

10. The computer-implemented method of claim 9, wherein the predetermined maximum floating-point scaling factor is a maximum value that is representable within a target binary word size.

11. The computer-implemented method of claim 9, wherein determining the integer scaling factor further comprises:
rounding the scaled floating-point scaling factor to a nearest integer value; and
designating the nearest integer value as the integer scaling factor.

12. A system comprising:
a receiving module, stored in memory of an artificial neural network (ANN), that receives an input value and a floating-point scaling factor for a scaling operation that is configured to scale one or more quantized integers to lower bit depths;
a determining module, stored in the memory of the ANN, that determines:
an integer scaling factor based on the floating-point scaling factor;
a pre-scaling adjustment value representative of a number of places by which to shift a binary representation of the input value prior to a scaling operation; and
a post-scaling adjustment value representative of a number of places by which to shift the binary representation of the input value following the scaling operation;
a calculating module, stored in the memory of the ANN, that calculates a scaled result value by:
shifting rightwards the binary representation of the input value by the pre-scaling adjustment value;
scaling the shifted binary representation of the input value by the integer scaling factor; and
shifting rightwards the shifted and scaled binary representation of the input value by the post-scaling adjustment value; and
at least one physical processor of the ANN that executes the receiving module, the determining module, and the calculating module.

13. The system of claim 12, wherein the input value comprises a 32-bit signed binary integer value.

14. The system of claim 12, wherein the calculating module further adjusts the scaled result value in accordance with a predetermined offset value.

15. The system of claim 12, further comprising a mapping module that maps the scaled result value to an 8-bit signed binary integer value.

16. The system of claim 12, wherein the calculating module scales the shifted binary representation of the input value by executing an integer multiplication operation using the shifted binary representation of the input value and the integer scaling factor.

17. The system of claim 12, wherein the determining module determines the integer scaling factor, the pre-scaling adjustment value, and the post-scaling adjustment value by:
while at least one of:
the floating-point scaling factor is less than a predetermined floor value, or
the post-scaling adjustment value is less than a predetermined maximum shift value,
incrementing the post-scaling adjustment value by a predetermined increment; and
scaling the floating-point scaling factor by a predetermined scaling value.

18. The system of claim 17, wherein the determining module determines the integer scaling factor, the pre-scaling adjustment value, and the post-scaling adjustment value further by, while the floating-point scaling factor is less than a predetermined maximum floating-point scaling factor and the pre-scaling adjustment value is less than the post-scaling adjustment value scaled by an additional predetermined scaling value:
incrementing the pre-scaling adjustment value by the predetermined increment; and
scaling the floating-point scaling factor by the predetermined scaling value.

19. The system of claim 18, wherein the determining module further determines the integer scaling factor by:
rounding the scaled floating-point scaling factor to a nearest integer value; and
designating the nearest integer value as the integer scaling factor.

20. A non-transitory, computer-readable medium comprising computer-readable instructions that, when executed by at least one processor of a computing device, cause the computing device to:
receive, at an artificial neural network (ANN), an input value and a floating-point scaling factor for a scaling operation that is configured to scale one or more quantized integers to lower bit depths;

determine, at the ANN:
- an integer scaling factor based on the floating-point scaling factor;
- a pre-scaling adjustment value representative of a number of places by which to shift a binary representation of the input value prior to a scaling operation; and
- a post-scaling adjustment value representative of a number of places by which to shift the binary representation of the input value following the scaling operation; and calculate, at the ANN, a scaled result value by:
- shifting rightwards the binary representation of the input value by the pre-scaling adjustment value;
- scaling the shifted binary representation of the input value by the integer scaling factor; and
- shifting rightwards the shifted and scaled binary representation of the input value by the post-scaling adjustment value.

\* \* \* \* \*